(12) United States Patent
Oshima

(10) Patent No.: US 12,430,088 B2
(45) Date of Patent: Sep. 30, 2025

(54) SYSTEM, TERMINAL, SERVER, IMAGE DISPLAY METHOD, AND PROGRAM

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/475,655

(22) Filed: Sep. 27, 2023

(65) Prior Publication Data
US 2024/0111470 A1  Apr. 4, 2024

(30) Foreign Application Priority Data
Sep. 29, 2022 (JP) ................................. 2022-156039

(51) Int. Cl.
*G06F 3/14* (2006.01)
*A63F 13/825* (2014.01)
*G06F 3/12* (2006.01)

(52) U.S. Cl.
CPC .............. *G06F 3/14* (2013.01); *A63F 13/825* (2014.09); *G06F 3/12* (2013.01); *A63F 2300/1087* (2013.01); *A63F 2300/8058* (2013.01)

(58) Field of Classification Search
None
See application file for complete search history.

(56) References Cited

U.S. PATENT DOCUMENTS

| | | | | |
|---|---|---|---|---|
| 2007/0002057 A1* | 1/2007 | Danzig | ................... | A63F 13/87 345/473 |
| 2011/0306410 A1* | 12/2011 | Tsugihashi | .............. | A63F 13/69 463/43 |
| 2013/0070111 A1* | 3/2013 | Ohtsuka | ................. | H04N 23/61 348/222.1 |

(Continued)

FOREIGN PATENT DOCUMENTS

| | | | |
|---|---|---|---|
| JP | 2016-179096 A | 10/2016 | |
| JP | 6392929 B1 * | 9/2018 | |

(Continued)

OTHER PUBLICATIONS

The extended European search report issued by the European Patent Office on Feb. 26, 2024, which corresponds to European Patent Application No. 23200050.5-1224 and is related to U.S. Appl. No. 18/475,655.

*Primary Examiner* — Patrick N Edouard
*Assistant Examiner* — Peijie Shen
(74) *Attorney, Agent, or Firm* — Studebaker Brackett PLLC

(57) ABSTRACT

A system, a terminal, a server, an image display method, and a program for detecting access to a first character image and for transmitting a second character image to which the first character image is changed are provided.
A system includes a server including a first processor that provides a character image, and a terminal including a second processor that communicates with the server through a network, in which the second processor is configured to, in (Continued)

a case where access to a first character image is detected, transmit detection information to the server, and the first processor is configured to, in a case where the detection information is received, transmit a second character image to which the first character image is changed to the terminal.

8 Claims, 16 Drawing Sheets

(56) References Cited

U.S. PATENT DOCUMENTS

| | | | |
|---|---|---|---|
| 2014/0185871 A1* | 7/2014 | Ito ..................... | G06V 20/20 |
| | | | 382/103 |
| 2015/0220777 A1* | 8/2015 | Kauffmann .......... | H04N 23/958 |
| | | | 382/103 |
| 2016/0133141 A1* | 5/2016 | Angeles ................ | A63F 13/352 |
| | | | 434/362 |
| 2018/0234708 A1* | 8/2018 | Chong ................. | H04N 21/472 |
| 2018/0350144 A1* | 12/2018 | Rathod ............... | G06Q 20/3224 |
| 2019/0240577 A1* | 8/2019 | Oshima ................ | A63F 13/46 |
| 2020/0342648 A1* | 10/2020 | Shimizu ................ | A61B 5/16 |
| 2021/0166077 A1* | 6/2021 | Yu ....................... | A63F 13/213 |
| 2023/0087879 A1* | 3/2023 | An ...................... | G06T 7/246 |
| | | | 345/474 |

FOREIGN PATENT DOCUMENTS

| | | | |
|---|---|---|---|
| JP | 6848852 B2 | * | 3/2021 |
| KR | 20170013539 A | * | 2/2017 |
| KR | 20210060030 A | * | 11/2019 |

* cited by examiner

FIG. 6

[ID MANAGEMENT DB]

| USER ID | CHARACTER ID | NUMBER OF SCANS | NUMBER OF PRINTINGS | TYPE | NUMBER OF EXTERIOR CHANGES | STATUS 1 | STATUS 2 | STATUS 3 | STATUS 4 |
|---|---|---|---|---|---|---|---|---|---|
| 10000001 | 1000000B | 2 | 2 | P0001 | 2 | 100 | 30 | 80 | 50 |
| | 1000000C | 0→1 | 1 | P0002 | 0→1 | 60→65 | 40→45 | 70→80 | 90→100 |
| | .... | .... | .... | .... | .... | .... | .... | .... | .... |
| 10000002 | .... | .... | .... | .... | .... | .... | .... | .... | .... |
| .... | .... | .... | .... | .... | .... | .... | .... | .... | .... |

[TYPE DB]

| CHARACTER ID | FIRST STATUS | SECOND STATUS | THIRD STATUS | .... |
|---|---|---|---|---|
| 1000000B | ⋮ | ⋮ | ⋮ | .... |
| 1000000C |  |  |  | .... |
| 1000000D | ⋮ | ⋮ | ⋮ | .... |

SYSTEM, TERMINAL, SERVER, IMAGE DISPLAY METHOD, AND PROGRAM

CROSS-REFERENCE TO RELATED APPLICATION

The present application claims priority under 35 U.S.C. § 119(a) to Japanese Patent Application No. 2022-156039 filed on Sep. 29, 2022, which is hereby expressly incorporated by reference, in its entirety, into the present application.

BACKGROUND OF THE INVENTION

1. Field of the Invention

The present invention relates to a system, a terminal, a server, an image display method, and a program.

2. Description of the Related Art

In the related art, various technologies for printing a character image in a game have been suggested.

For example, JP2016-179096A discloses a technology for increasing interest of a player in a game by printing different characters depending on a type of blank card having a blank region.

SUMMARY OF THE INVENTION

One embodiment according to the disclosed technology provides a system, a terminal, a server, an image display method, and a program for detecting access to a first character image and for transmitting a second character image to which the first character image is changed.

A system according to an aspect of the present invention is a system comprising a server including a first processor that provides a character image, and a terminal including a second processor that communicates with the server through a network, in which the second processor is configured to, in a case where access to a first character image is detected, transmit detection information to the server, and the first processor is configured to, in a case where the detection information is received, transmit a second character image to which the first character image is changed to the terminal.

It is preferable that the detection information is first information transmitted to the server in a case where the first character image is output to a printer.

It is preferable that the detection information is second information transmitted to the server in a case where a print of the first character image printed by a printer is scanned with the terminal.

It is preferable that the first character image is displayed on the terminal.

It is preferable that the first processor is configured to transmit the second character image to the terminal in a case where the number of transmissions of the detection information reaches a threshold value.

It is preferable that the terminal includes a camera and transmits the second information to the server by capturing a code image printed on the print via the camera.

It is preferable that the server includes a memory that stores at least one of information about a user who owns a character of the character image, status information of the character, or information related to an exterior of the character.

It is preferable that the second processor is configured to transmit acquisition information that is information related to a location or a time in which the code image is captured to the server, and the first processor is configured to receive the acquisition information and transmit the second character image corresponding to the acquisition information to the terminal.

It is preferable that the first processor is configured to permit the second character image to be transmitted to the terminal only a predetermined number of times in a predetermined period.

It is preferable that the second processor is configured to acquire two or more code images and transmit the second information of each code image to the server, and the first processor is configured to receive a plurality of pieces of the second information and transmit the second character image corresponding to the plurality of pieces of the second information to the terminal.

It is preferable that the second character image includes effect information that is information related to an effect added in a case where the second character image is displayed.

It is preferable that the character image is composed of a character of a game or of a captured image of a person.

A terminal according to another aspect of the present invention is a terminal comprising a processor, in which the processor is configured to, in a case where access to a first character image is detected, transmit detection information to a server, and the processor is configured to, in a case where the server receives the detection information and transmits a second character image to which an exterior of the first character image is changed to the processor, display the second character image.

A server according to still another aspect of the present invention is a server comprising a processor, in which the processor is configured to, in a case where detection information transmitted to the server in a case where a terminal detects access to a first character image is acquired, transmit a second character image to which an exterior of the first character image is changed to the terminal.

A terminal according to still another aspect of the present invention is a terminal comprising a processor, and a memory that stores a character image, in which the processor is configured to, in a case where access to a first character image is detected, display a second character image to which the first character image is changed.

An image display method according to still another aspect of the present invention is an image display method of a system including a server including a first processor that provides a character image, and a terminal including a second processor that communicates with the server through a network, the image display method comprising, via the second processor, transmitting, in a case where access to a first character image is detected, detection information to the server, and via the first processor, transmitting, in a case where the detection information is received, a second character image to which the first character image is changed to the terminal.

A program according to still another aspect of the present invention is a program causing a system to execute an image display method, the system including a server including a first processor that provides a character image, and a terminal including a second processor that communicates with the server through a network, in which the second processor is caused to execute transmitting, in a case where access to a first character image is detected, detection information to the server, and the first processor is caused to execute transmitting, in a case where the detection information is received, a second character image to which the first character image is changed to the terminal.

BRIEF DESCRIPTION OF THE DRAWINGS

FIG. 6 is a table showing an example of status information of a character owned in a game by a user managed in an ID management DB.

DESCRIPTION OF THE PREFERRED EMBODIMENTS

Hereinafter, preferred embodiments of a system, a terminal, a server, an image display method, and a program according to an embodiment of the present invention will be described in accordance with the accompanying drawings.

First, a character image display system (corresponds to the system according to the embodiment of the present invention) according to the embodiment of the present invention will be described. While a character image of a character of a game will be described in the following description, a character image according to the embodiment of the present invention is not limited thereto. For example, a captured image obtained by imaging a person such as an idol can also be used as the character image in the present invention.

Figure 1:
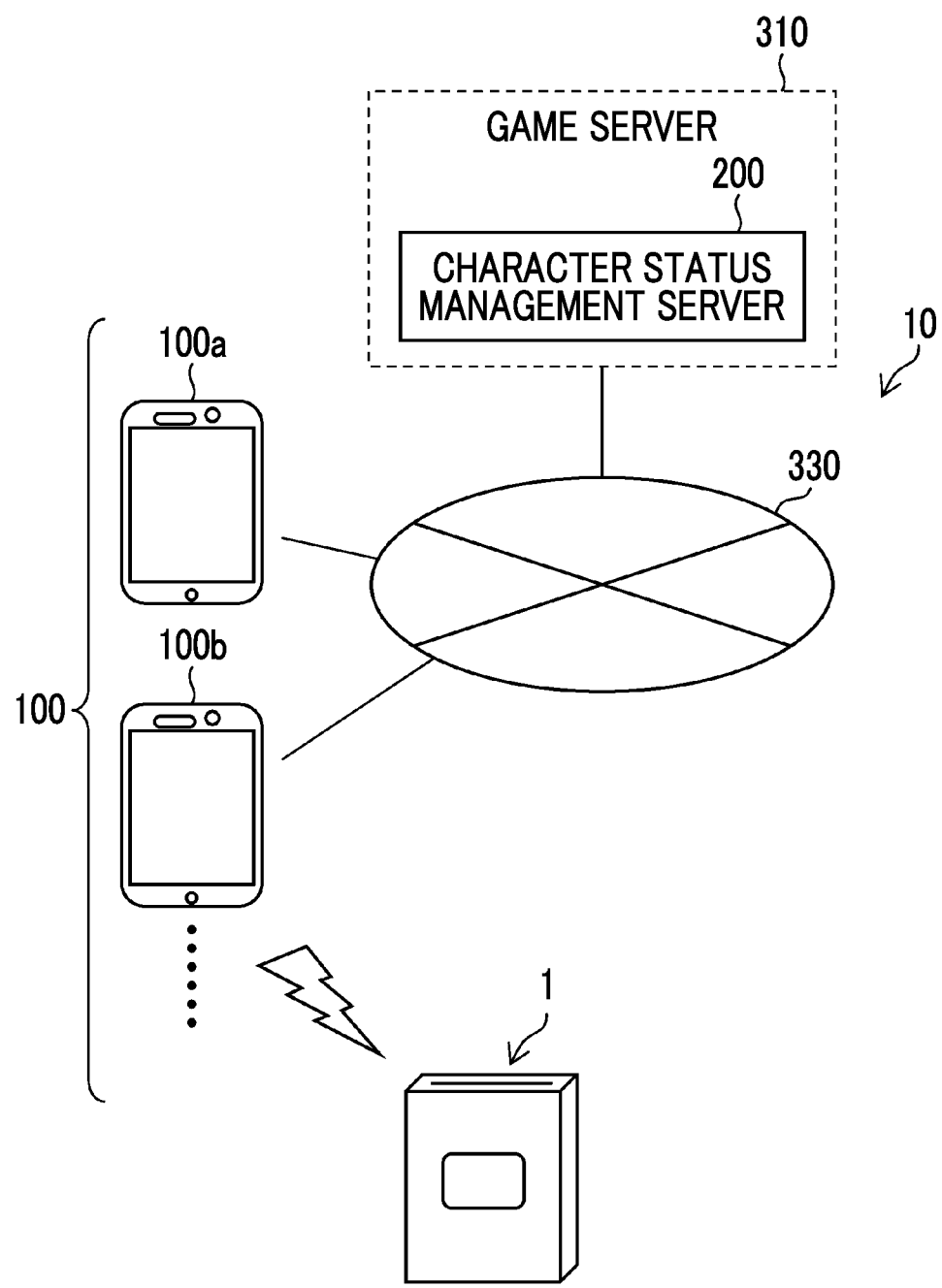
FIG. 1 is a conceptual diagram of a character image display system.

FIG. 1 is a conceptual diagram of the character image display system according to the embodiment of the present invention.

A character image display system 10 is mainly composed of a camera-equipped information terminal (corresponds to the terminal according to the embodiment of the present invention) 100 (100a, 100b, . . . ) owned by each user and a character status management server (corresponds to the server according to the embodiment of the present invention) 200 included in a game server 310. The camera-equipped information terminal 100 and the character status management server 200 are connected through a network 330 such as the Internet. In addition, the camera-equipped information terminal 100 transmits a printing instruction to a mobile printer 1, and the mobile printer 1 outputs a print (character card 300; refer to FIG. 8) in accordance with the printing instruction. The camera-equipped information terminal 100 and the mobile printer 1 are connected in a wireless or wired manner and can communicate with each other. While the mobile printer 1 will be described as an example of a printer in the present example, application of the present invention is not limited to the mobile printer 1. For example, a stationary type printer installed in various stores such as a photo studio, a bookstore, and a supermarket or a stationary type printer installed at home or in an office can be used in the present invention instead of the mobile printer 1.

The camera-equipped information terminal 100 (100a, 100b, . . . ) may take the form of, for example, a smartphone, a mobile information terminal, a game apparatus, and a tablet terminal.

The character status management server 200 is included in the game server 310. The character status management server 200 is a server that manages a status of a character of a game provided by the game server 310. The game server 310 communicates with the camera-equipped information terminal 100 to provide the game to the user who owns the camera-equipped information terminal 100. For example, the game server 310 provides the game in which multiple characters appear to the user, and the characters grow or transform. The growth or transformation of the characters increases interest of the user in the game. In addition, the character image display system 10 exchanges information with the game server 310 to provide a character image of a grown or transformed character to the user in a case where the user accesses the character image. Accordingly, attachment or interest of the user with respect to the character is further increased. While the character image display system 10 will be mainly described in the following description, a terminal (display device) having the same function as the character image display system 10 can also be implemented.

Camera-Equipped Information Terminal 100

Hereinafter, a smartphone that may function as the camera-equipped information terminal 100 will be described.

Figure 2:
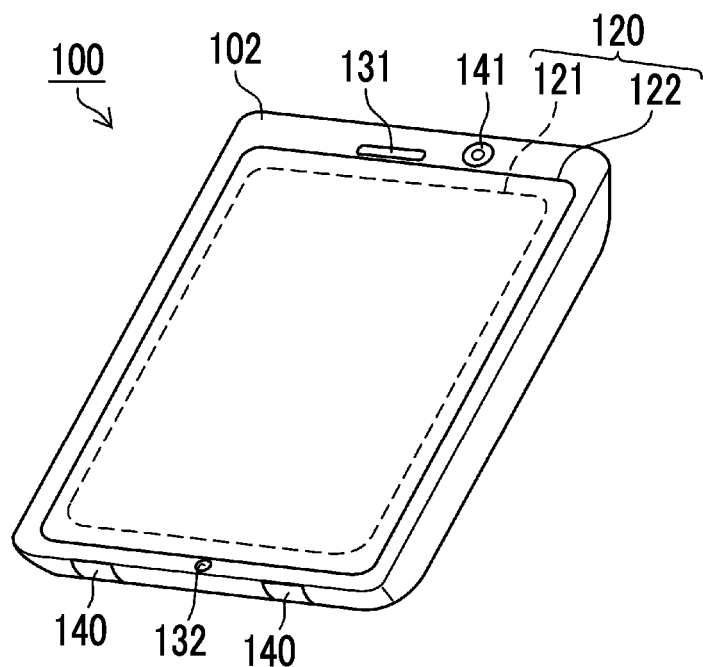
FIG. 2 is a diagram illustrating an exterior of a smartphone that is an embodiment of a camera-equipped information terminal.
Figure 3:
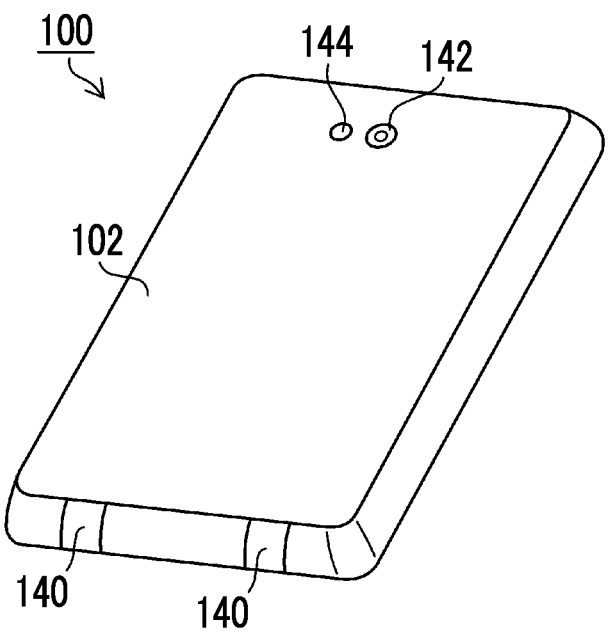
FIG. 3 is a diagram illustrating the exterior of the smartphone that is an embodiment of the camera-equipped information terminal.

Each of FIG. 2 and FIG. 3 is a diagram illustrating an exterior of a smartphone that is an embodiment of the camera-equipped information terminal 100. FIG. 2 is a perspective view of the camera-equipped information terminal 100 seen from a surface side (operation surface side) of the camera-equipped information terminal 100, and FIG. 3 is a perspective view of the camera-equipped information terminal 100 seen from a rear surface side of the camera-equipped information terminal 100.

The camera-equipped information terminal 100 illustrated in FIG. 2 and FIG. 3 has a housing 102 having a flat plate shape. A display and input unit 120 formed by integrating a display panel 121 as a display unit with an operation panel 122 as an input unit is provided on one surface of the housing 102. In addition, the housing 102 comprises a speaker 131, a microphone 132, an operation unit 140, camera units 141 and 142, and a light emitting diode (LED) light 144. The housing 102 is not limited to this configuration and, for example, can employ a configuration in which the display unit and the input unit are independently provided or can employ a configuration having a folded structure or a sliding mechanism.

Figure 4:
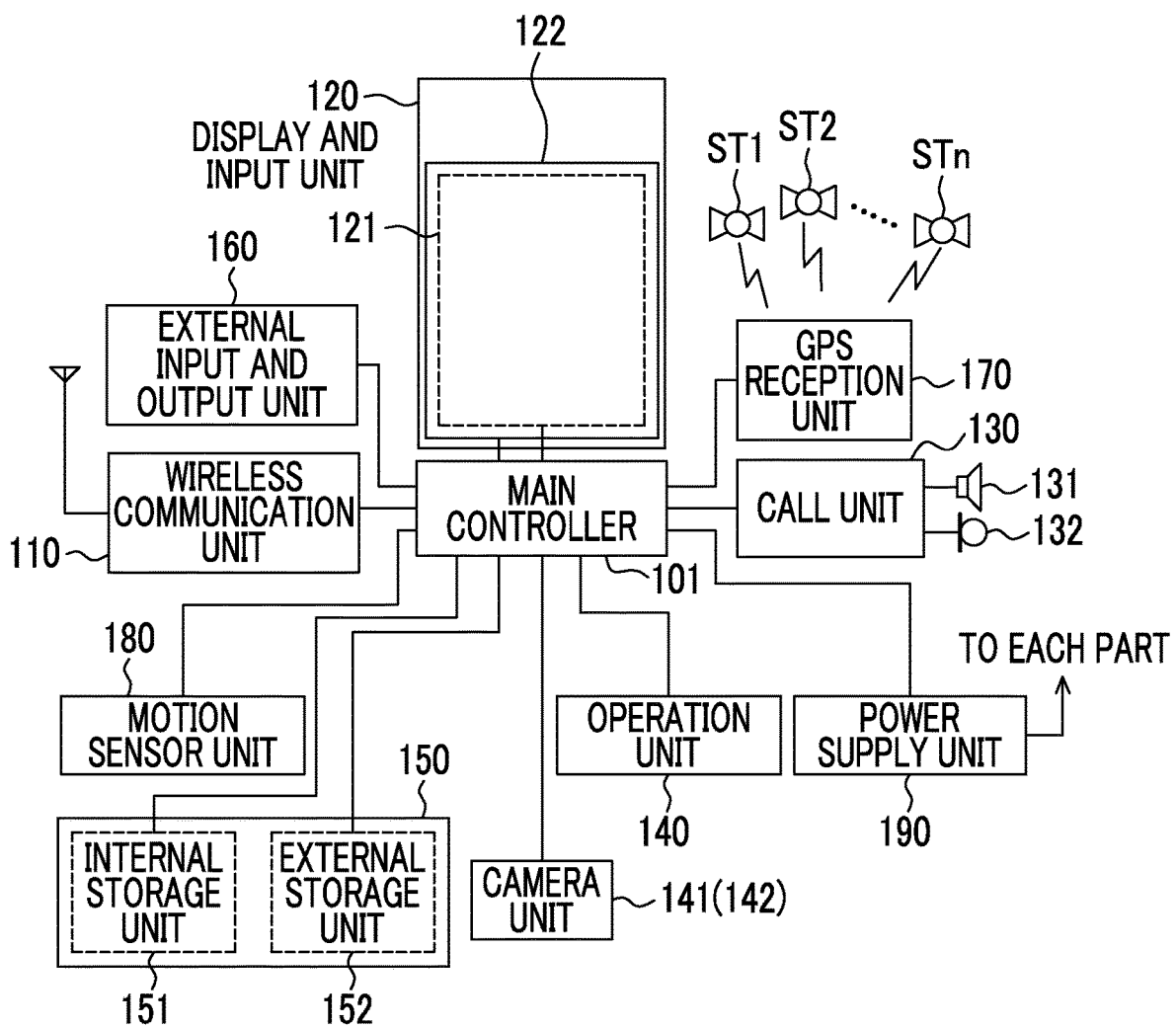
FIG. 4 is a block diagram illustrating an internal configuration of the camera-equipped information terminal.

FIG. 4 is a block diagram illustrating an internal configuration of the camera-equipped information terminal 100 illustrated in FIG. 2 and FIG. 3. As illustrated in FIG. 4, the camera-equipped information terminal 100 comprises a wireless communication unit 110, the display and input unit 120, a call unit 130, the operation unit 140, the camera units 141 and 142, a storage unit 150, an external input and output unit 160, a GPS reception unit 170, a motion sensor unit 180, a power supply unit 190, and a main controller 101 as main constituents. In addition, the camera-equipped information terminal 100 comprises a wireless communication function of performing mobile wireless communication through a base station apparatus and through a mobile communication network as a main function.

The wireless communication unit 110 performs wireless communication with the base station apparatus connected to the mobile communication network in accordance with an instruction of the main controller 101. This wireless communication is used to transmit and receive various types of file data such as audio data and image data, electronic mail data, and the like and to receive web data, streaming data, and the like.

The display and input unit 120 is a so-called touch panel comprising the operation panel 122 disposed on a screen of the display panel 121 and, under control of the main controller 101, visually delivers information to the user by displaying images (still images and videos), text information, and the like and detects a user operation with respect to the displayed information. The operation panel 122 will be referred to as a touch panel for convenience.

The display panel 121 uses a liquid crystal display (LCD), an organic electro-luminescence display (OELD), or the like as a display device. The operation panel 122 is a device that is provided in a state where an image displayed on a display surface of the display panel 121 is visible and that detects one or a plurality of coordinates operated with a finger of the user or with a stylus. In a case where this device is operated with the finger of the user or with the stylus, the operation panel 122 outputs a detection signal generated by the operation to the main controller 101. Next, the main controller 101 detects an operation position (coordinates) on the display panel 121 based on the received detection signal.

The display panel 121 and the operation panel 122 of the camera-equipped information terminal 100 illustrated in FIG. 2 are integrated to constitute the display and input unit 120, and the operation panel 122 is disposed to completely cover the display panel 121. In a case where this disposition is employed, the operation panel 122 may comprise a function of detecting the user operation even in a region outside the display panel 121. In other words, the operation panel 122 may comprise a detection region (hereinafter, referred to as a "display region") for an overlapping portion that overlaps with the display panel 121 and a detection region (hereinafter, referred to as a "non-display region") for the other outer edge portion that does not overlap with the display panel 121.

While a size of the display region and a size of the display panel 121 may be completely matched, it is not necessarily required to match both sizes. In addition, the operation panel 122 may comprise two sensitive regions of the outer edge portion and the other inner portion. Furthermore, a width of the outer edge portion is appropriately designed in accordance with a size and the like of the housing 102. Furthermore, examples of a position detection method employed in the operation panel 122 include a matrix switch method, a resistive membrane system, a surface acoustic wave method, an infrared method, an electromagnetic induction method, and a capacitance type, and any of the methods may be employed.

The call unit 130 comprises the speaker 131 and the microphone 132 and converts voice of the user input through the microphone 132 into audio data processible in the main controller 101 and outputs the audio data to the main controller 101 or decodes audio data received by the wireless communication unit 110 or by the external input and output unit 160 and outputs the decoded audio data from the speaker 131. In addition, as illustrated in FIG. 2, for example, the speaker 131 and the microphone 132 can be mounted on the same surface as the surface on which the display and input unit 120 is provided.

The operation unit 140 is a hardware key using a key switch or the like and receives an instruction from the user. For example, as illustrated in FIG. 2, the operation unit 140 is a push-button switch that is mounted on a side surface of the housing 102 of the camera-equipped information terminal 100 and that changes to a switch-ON state in a case where the operation unit 140 is pressed with a finger or the like and changes to a switch-OFF state because of restoring force of a spring or the like in a case where the finger is released.

The storage unit 150 stores a control program and control data of the main controller 101, application software (including the program according to the embodiment of the present invention), address data in which a name, a telephone number, and the like of a communication counterpart are associated with each other, data of transmitted and received electronic mails, web data downloaded by web browsing, downloaded content data, and the like. In addition, the storage unit 150 temporarily stores streaming data and the like.

In addition, the storage unit 150 is composed of an internal storage unit 151 incorporated in the camera-equipped information terminal 100 and an external storage unit 152 including an external memory slot to and from which an external memory can be attached and detached. Each of the internal storage unit 151 and the external storage unit 152 constituting the storage unit 150 is implemented using a storage medium such as a memory of a flash memory type, a hard disk type, a multimedia card micro type, or a card type, a random access memory (RAM), or a read only memory (ROM).

The external input and output unit 160 serves as an interface for all external apparatuses connected to the camera-equipped information terminal 100 and is directly or indirectly connected to the other external apparatuses by communication or the like (for example, universal serial bus (USB) or IEEE 1394) or through a network (for example, a wireless local area network (LAN), Bluetooth (registered trademark), radio frequency identification (RFID), infrared communication (infrared data association (IrDA)), Ultra Wideband (UWB) (registered trademark), or ZigBee (registered trademark)).

The external apparatuses connected to the camera-equipped information terminal 100 include the mobile printer 1. In addition, other external apparatuses connected to the camera-equipped information terminal 100 include, for example, a wired or wireless headset, a wired or wireless external charger, a wired or wireless data port, a memory card or a subscriber identity module (SIM)/user identity module (UIM) card connected through a card socket, an external audio and video apparatus connected through an audio and video input/output (I/O) terminal, an external audio and video apparatus connected in a wired or wireless manner, a smartphone, a personal computer, a personal digital assistant (PDA), and an earphone. The external input and output unit 160 may be configured to deliver data transmitted from the external apparatuses to each constituent inside the camera-equipped information terminal 100 or to transmit data inside the camera-equipped information terminal 100 to the external apparatuses.

The GPS reception unit 170 that functions as a positional information detection unit which detects a position of the camera-equipped information terminal 100 receives GPS signals transmitted from GPS satellites ST1, ST2, . . . , STn and executes positioning calculation processing based on a received plurality of GPS signals in accordance with an instruction of the main controller 101 to acquire positional information (GPS information) specified by a latitude, a longitude, and an altitude of the camera-equipped information terminal 100. In a case where the positional information can be acquired from the wireless communication unit 110 and/or the external input and output unit 160 (for example, a wireless LAN), the GPS reception unit 170 can detect the position using the positional information.

The motion sensor unit 180 comprises, for example, a three-axis acceleration sensor and detects a physical motion of the camera-equipped information terminal 100 in accordance with an instruction of the main controller 101. By detecting the physical motion of the camera-equipped information terminal 100, a moving direction and acceleration of the camera-equipped information terminal 100 are detected. A result of the detection is output to the main controller 101. In addition, the camera-equipped information terminal 100 preferably comprises an azimuthal information detection unit (electronic compass) that detects azimuthal information indicating an imaging direction of the camera unit 142.

The power supply unit 190 supplies power stored in a battery (not illustrated) to each part of the camera-equipped information terminal 100 in accordance with an instruction of the main controller 101.

The main controller 101 comprises a microprocessor (corresponds to a second processor or a processor according to the embodiment of the present invention) and operates in accordance with the control program and the control data stored in the storage unit 150 to manage and control each part of the camera-equipped information terminal 100. In addition, the main controller 101 comprises a mobile communication control function of controlling each part of a communication system and an application processing function to perform voice communication and data communication through the wireless communication unit 110.

The application processing function is implemented by operating the main controller 101 in accordance with the application software stored in the storage unit 150. Examples of the application processing function include an infrared communication function of performing data communication with counter equipment by controlling the external input and output unit 160, an electronic mail function of transmitting and receiving an electronic mail, and a web browsing function of viewing a web page.

In addition, the main controller 101 comprises an image processing function of, for example, displaying a video on the display and input unit 120 based on image data (data of still images or of a video) such as reception data or downloaded streaming data. The image processing function refers to a function of decoding the image data, performing image processing on a decoding result, and displaying an image obtained through the image processing on the display and input unit 120 via the main controller 101.

Furthermore, the main controller 101 executes a display control of the display panel 121 and an operation detection control of detecting the user operation performed through the operation unit 140 or through the operation panel 122.

By executing the display control, the main controller 101 displays an icon for starting the application software or a software key such as a scroll bar or displays a window for creating an electronic mail. The scroll bar refers to a software key for receiving an instruction to move a display part of an image for a large image or the like that does not fit in the display region of the display panel 121.

In addition, by executing the operation detection control, the main controller 101 detects the user operation performed through the operation unit 140, receives an operation with respect to the icon or an input of a character string in an input field of the window through the operation panel 122, or receives a request to scroll the display image through the scroll bar.

Furthermore, by executing the operation detection control, the main controller 101 comprises a touch panel control function of determining whether the operation position on the operation panel 122 corresponds to the overlapping portion (display region) overlapping with the display panel 121 or corresponds to the other outer edge portion (non-display region) not overlapping with the display panel 121 and of controlling the sensitive regions of the operation panel 122 and a display position of the software key.

In addition, the main controller 101 can detect a gesture operation with respect to the operation panel 122 and execute a function set in advance in accordance with the detected gesture operation. The gesture operation is not a simple touch operation in the related art and means an operation of moving a finger or the like along a path, designating a plurality of positions at the same time, or as a combination thereof, moving at least one of a plurality of positions along a path.

The camera units 141 and 142 provided on the surface side and the rear surface side of the camera-equipped information terminal 100 can convert image data obtained by imaging into compressed image data of, for example, joint photographic experts group (JPEG) and record the image data in the storage unit 150 or output the image data through the external input and output unit 160 or through the wireless communication unit 110 under control of the main controller 101. The camera unit 141 is mainly used for taking a selfie, and the camera unit 142 is used for normal imaging. The camera units 141 and 142 may be switched to be used alone or may be used at the same time.

In addition, the camera units 141 and 142 can be used in various functions of the camera-equipped information terminal 100. For example, images acquired by the camera units 141 and 142 may be displayed on the display panel 121, and images acquired by imaging via the camera units 141 and 142 may be used as one of operation input methods of the operation panel 122. In addition, in a case where the GPS reception unit 170 detects the position, the position may be detected by referring to the images from the camera units 141 and 142. Furthermore, by referring to the images from the camera units 141 and 142, it is possible to determine an optical axis direction of the camera unit 141 of the camera-equipped information terminal 100 or to determine the current use environment without using the three-axis acceleration sensor or together with the three-axis acceleration sensor. Of course, the images from the camera units 141 and 142 can be used in the application software.

The LED light 144 for illumination illustrated in FIG. 3 is preferably capable of emitting white light or infrared light, and the camera unit 142 is preferably capable of performing infrared imaging in a case where infrared light is emitted from the LED light 144. For example, infrared imaging can be performed by using an image sensor having sensitivity to an infrared wavelength range as an image sensor of the camera unit 142. The camera unit 142 that can perform infrared imaging is applied to the case of imaging information (a text image or a code image described later) printed with invisible ink (infrared ink).

In addition, data obtained by adding the positional information acquired by the GPS reception unit 170, voice information (may be text information obtained by performing voice to text conversion via the main controller or the like) acquired by the microphone 132, posture information acquired by the motion sensor unit 180, and the like to the image data of the still images or of the video can be recorded in the storage unit 150 or be output through the external input and output unit 160 or through the wireless communication unit 110.

The camera-equipped information terminal 100 having the above configuration communicates with the game server 310 by executing game application software (hereinafter referred to as a "game app") downloaded from the game server 310 via the main controller 101. Accordingly, the user can play an online game. In addition, as will be described later, the camera-equipped information terminal 100 can scan the print (character card 300) on which the character image is printed and can output the character card 300 obtained by printing the character image on a print paper sheet by transmitting the character image displayed on the display and input unit 120 to the mobile printer 1.

Character Status Management Server

Next, the character status management server 200 will be described.

Figure 5:
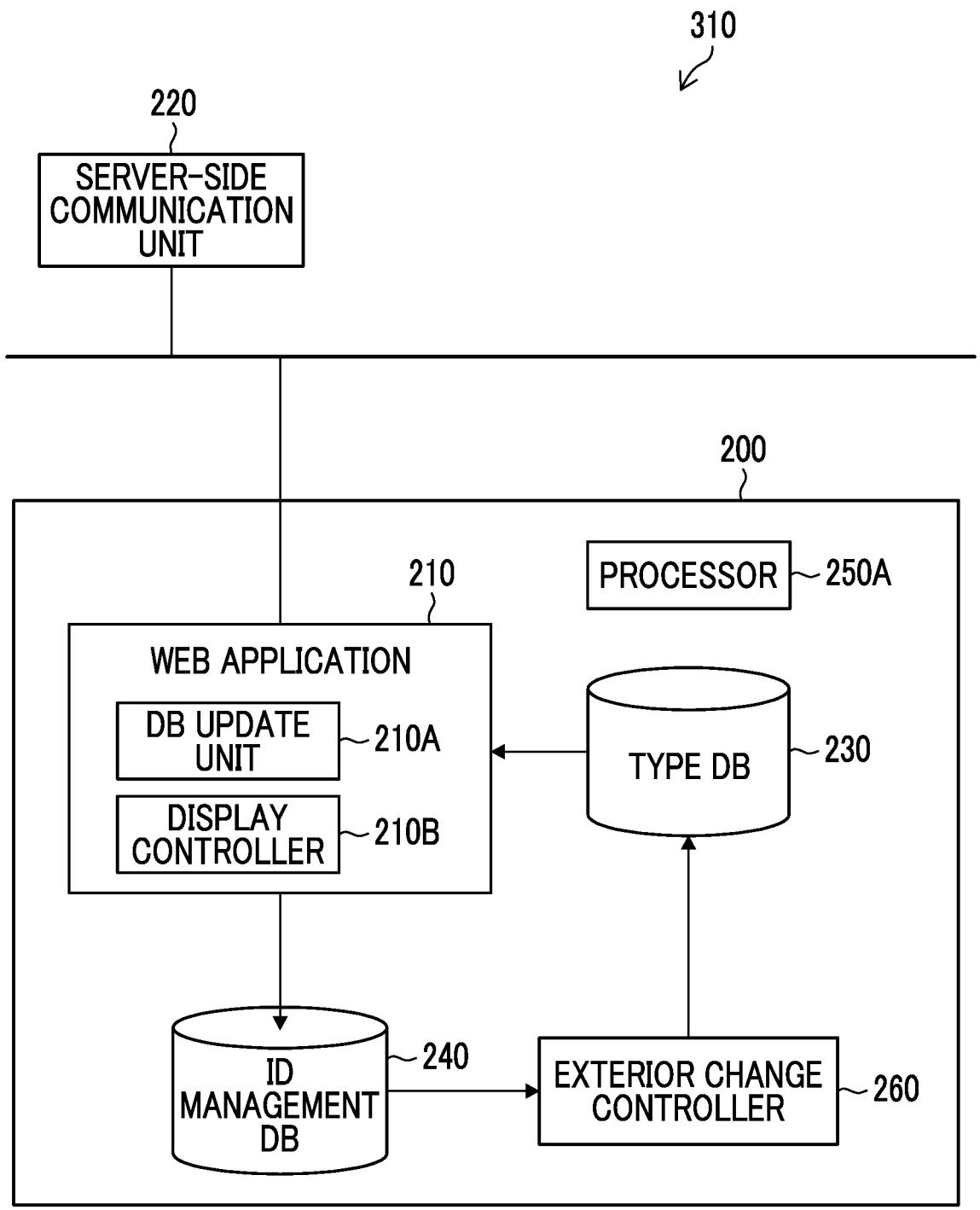
FIG. 5 is a block diagram illustrating a character status management server.

FIG. 5 is a block diagram illustrating the character status management server 200 constituting the character image display system 10 illustrated in FIG. 1. While the character status management server 200 is included in the game server 310, the game server 310 will not be described in detail here.

The character status management server 200 mainly comprises a processor (corresponds to a first processor or the processor according to the embodiment of the present invention) 250, a web application 210, a type database (DB) 230, an identification (ID) management database (DB) 240, and an exterior change controller 260. In addition, the game server 310 is provided with a server-side communication unit 220, and the character status management server 200 communicates with the camera-equipped information terminal 100 through the server-side communication unit 220.

The server-side communication unit 220 is a part that communicates with the camera-equipped information terminal 100 (wireless communication unit 110), which executes the game app through the network 330, by transmitting and receiving required information to and from the camera-equipped information terminal 100 and exchanges information required for executing the online game in the camera-equipped information terminal 100. In addition, the server-side communication unit 220 functions as an imaging information acquisition unit that acquires the positional information indicating the current position of the camera-equipped information terminal 100, the azimuthal information indicating the imaging direction of the camera unit 142, and positional information indicating an imaging position and azimuthal information indicating an imaging direction of a captured image for the camera unit 142 during the online game. In addition, the server-side communication unit 220 transmits the character image (a computer graphics (CG) image or an animation image) showing the character appearing in the game and status information related to the character of the game to the camera-equipped information terminal 100 during the online game.

The web application 210 is composed of a DB update unit 210A and a display controller 210B. The web application 210 operates by executing a dedicated program via the processor 250. The DB update unit 210A of the web application 210 receives detection information transmitted from the camera-equipped information terminal 100 and updates the ID management DB in accordance with the detection information. In addition, the display controller 210B of the web application 210 transmits the character image transmitted from the type DB 230 to the camera-equipped information terminal 100 and controls display of the character image on the camera-equipped information terminal 100.

The ID management DB 240 manages the status information of the character owned in the game for each user (for each player of the online game) of the camera-equipped information terminal 100.

FIG. 6 is a table showing an example of the status information of the character owned in the game by the user managed in the ID management DB 240.

The status information of the character is managed in the ID management DB 240 using user identification information (user identification (ID)) as a main key. Here, the status information of the character is composed of character identification information (character identification (ID)), the number of scans, the number of printings, a type, the number of exterior changes, a status 1, a status 2, a status 3, and a status 4.

The user ID is registered in the ID management DB 240 during user registration using the camera-equipped information terminal 100. The character ID is registered in a case where the user selects or acquires the character in the game. The number of scans and the number of printings are updated in a case where the character is scanned and in a case where the character is printed, respectively. The type indicates a type of the character. The type of the character is registered in the type DB (FIG. 7) described later. The number of exterior changes is updated in a case where an exterior of the character is changed. The statuses 1 to 4 are values characterizing the character in the game. For example, the statuses 1 to 4 are strength, speed, intelligence, and hearing. In addition, degrees of the statuses 1 to 4 are represented by numerical values. The status information of the character is not limited to the above information and can include various types of information related to the status of the character.

In addition, the ID management DB 240 is updated by the web application 210. FIG. 6 illustrates that the status information of the character of an ID 1000000C is updated by the web application 210. Specifically, the character image (or the code image) of the character of the ID 1000000C is scanned with the camera-equipped information terminal 100 owned by a user 10000001. Accordingly, the number of scans, the number of exterior changes, and the statuses 1 to 4 are updated by the web application 210.

The exterior change controller 260 controls the change of the character image. Specifically, the exterior change controller 260 has a threshold value for the number of scans and/or the number of printings and controls the exterior change to be performed in a case where the number of scans and/or the number of printings is greater than or equal to the threshold value (in a case where the threshold value is reached). Specifically, in a case where the exterior change controller 260 has the threshold value (=1) of the number of scans, the exterior change of the character image is performed in a case where the number of scans is updated from 0 to 1. In a case where the exterior change is performed, the exterior change controller 260 instructs the type DB to perform the exterior change of the character, and the type DB 250 changes the character image to which the type DB 250 refers. For example, the type DB 250 refers to the character image (FIG. 7) of a first status before the exterior change and refers to the character image of a second status (FIG. 7) after the exterior change. The web application 210 transmits the character image of the second status to the camera-equipped information terminal 100 to display the character image of the second status on the display and input unit 120 of the camera-equipped information terminal 100. Since the exterior change controller 260 has the threshold value for the number of scans and/or the number of printings and can control the exterior change of the character image using the threshold value, attachment or interest of the user with respect to the character can be further increased. In addition, the web application 210 may permit the character image after the exterior change to be transmitted only a predetermined number of times or less in a predetermined period. In a case where the exterior change of the character occurs too frequently, attachment or interest of the user with respect to the character may be decreased. Thus, a restriction may be imposed on the frequency of the exterior change. In addition, such a restriction also functions to prevent an unauthorized activity of frequently performing the exterior change of the character image.

Figure 7:
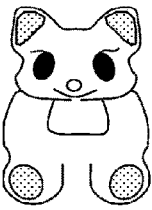
FIG. 7 is a table showing an example of character information managed in a type DB.
Figure 7:
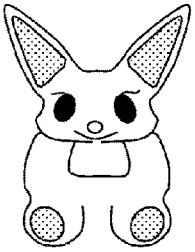
Figure 7:
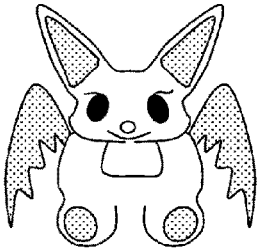

FIG. 7 is a table showing an example of character information managed in the type DB 250.

The character information of the game provided by the game server 310 is stored in the type DB 250. The character information is composed of various types of information related to the character including information related to the exterior of the character. In the following description, the information related to the exterior of the character stored in the type DB 250 will be mainly described.

In the type DB 250, the character image of each status is stored using the character ID as a main key. For example, character images of the first status to a third status are specifically shown for the character of 1000000C. In a case where the character of 1000000C transitions from the first status to the second status, an exterior change of increasing ears of the character image occurs. In a case where the character of 1000000C transitions from the second status to the third status, an exterior change of wings grown on the character occurs. Accordingly, the character image is grown or transformed depending on each status. The exterior change is performed in different forms for each character, and the number of levels is also different for each character.

As described above, the character status management server 200 is included in the game server 310. The character status management server 200 controls the exterior change of the character appearing in the game provided by the game server 310 and displays the character image after the exterior change on the display and input unit 120 of the camera-equipped information terminal 100.

Next, access to the character image performed by the camera-equipped information terminal 100 will be described.

Figure 8:
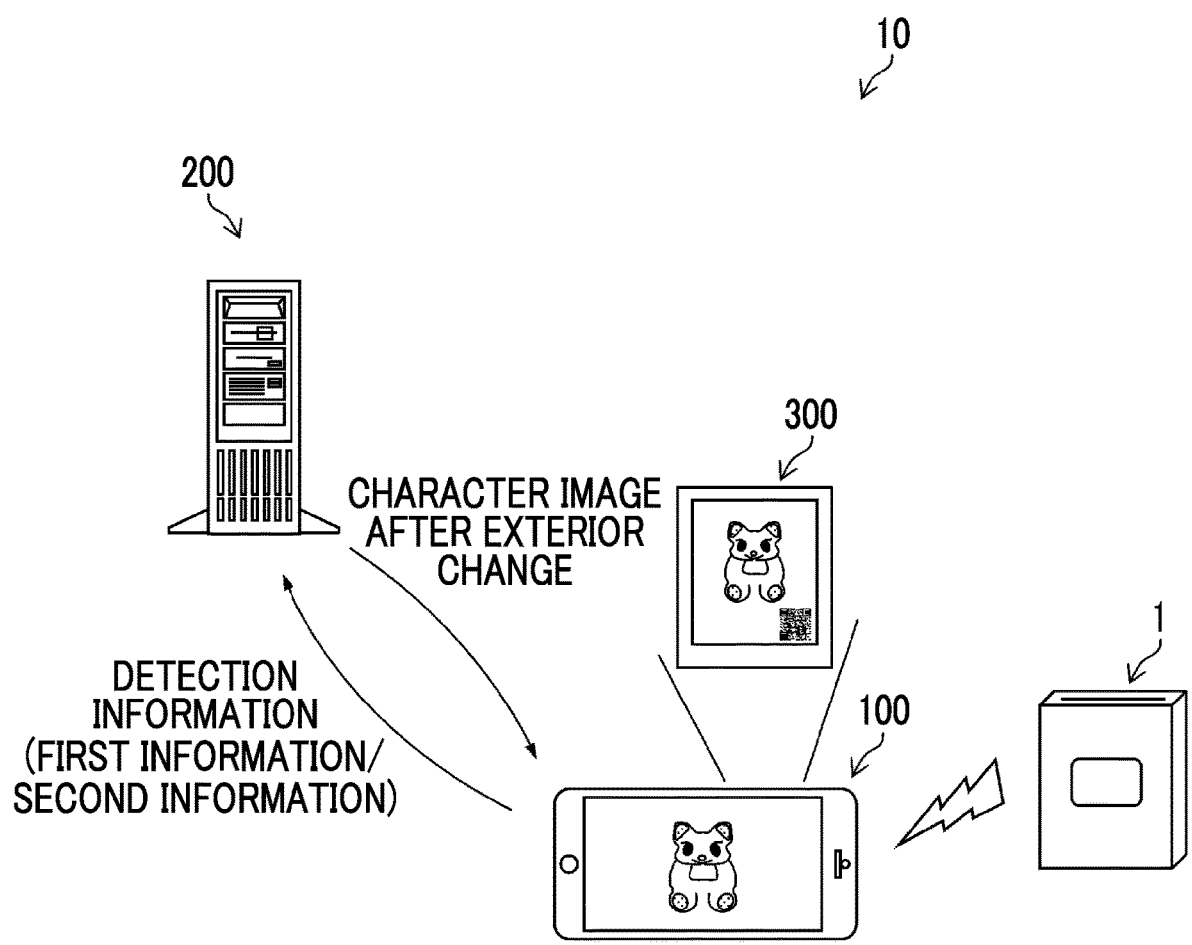
FIG. 8 is a diagram for describing access to a character image performed by the camera-equipped information terminal.

FIG. 8 is a diagram for describing access to the character image performed by the camera-equipped information terminal 100.

In a case where access to the character image is detected, the camera-equipped information terminal 100 transmits the detection information to the character status management server 200. In the present embodiment, a "case where character image is accessed" refers to, for example, a case where the character image is scanned or a case where the character image is printed.

The main controller 101 of the camera-equipped information terminal 100 detects scanning of the character image and then transmits the detection information to the character status management server 200. In addition, the main controller 101 of the camera-equipped information terminal 100 detects output of the printing instruction of the character image to the mobile printer 1 and transmits the detection information to the character status management server 200.

Here, the detection information is composed of first information or of second information. The first information is information that is transmitted to the character status management server 200 in a case where the character image is output to the mobile printer 1 (or in a case where the printing instruction of the character image is transmitted to the mobile printer 1). In addition, the second information is information that is transmitted to the character status management server 200 in a case where the character card 300 is scanned with the camera-equipped information terminal 100.

The character status management server 200 that has received the detection information compares the number of scans or the number of printings with the threshold value and, in a case where the number of scans or the number of printings reaches the threshold value, transmits the character image after the exterior change to the camera-equipped information terminal 100. Hereinafter, scanning of the character image and printing of the character image that correspond to access to the character image will be described in detail.

Figure 9:
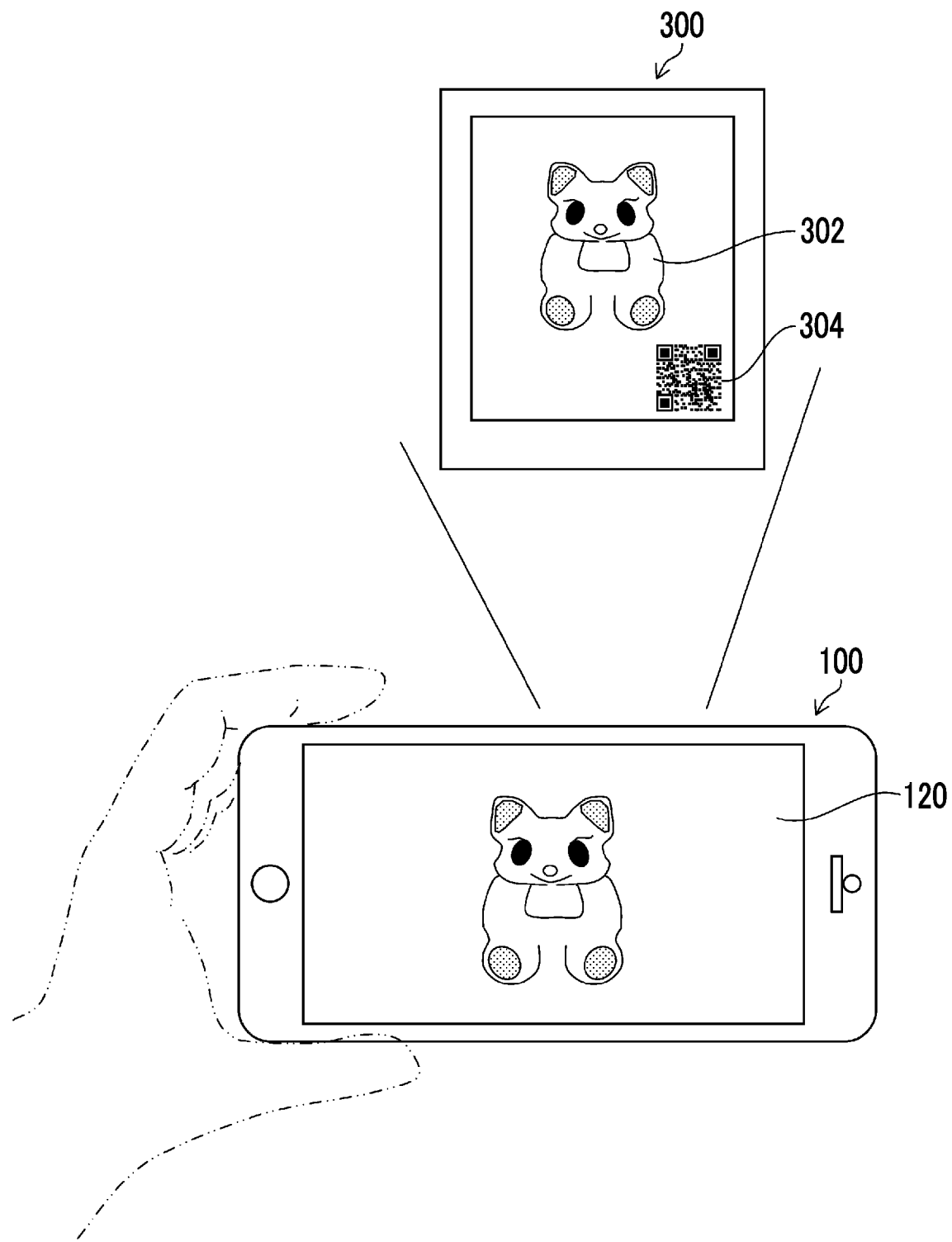
FIG. 9 is a diagram for describing scanning of a character card.

FIG. 9 is a diagram for describing scanning of the character card 300.

The camera-equipped information terminal 100 images the character card 300 via the camera unit 142. Specifically, a character image 302 and a code image 304 of the character card 300 are captured by the camera unit 142, and information (for example, the character ID) related to the character image 302 is acquired using the code image 304. The camera-equipped information terminal 100 that has acquired the information related to the character image 302 accesses the character status management server 200 and displays the character image 302 on the display and input unit 120. In addition, the camera-equipped information terminal 100 detects scanning of the character card 300 and transmits the detection information (second information) to the character status management server 200 via the main controller 101. Various code images can be used as the code image 304. For example, a quick response (QR) code or a barcode is used as the code image 304. Accordingly, the camera-equipped information terminal 100 scans the character image 302 by imaging the character card 300 and displays the character image 302 on the display and input unit 120.

Figure 10:
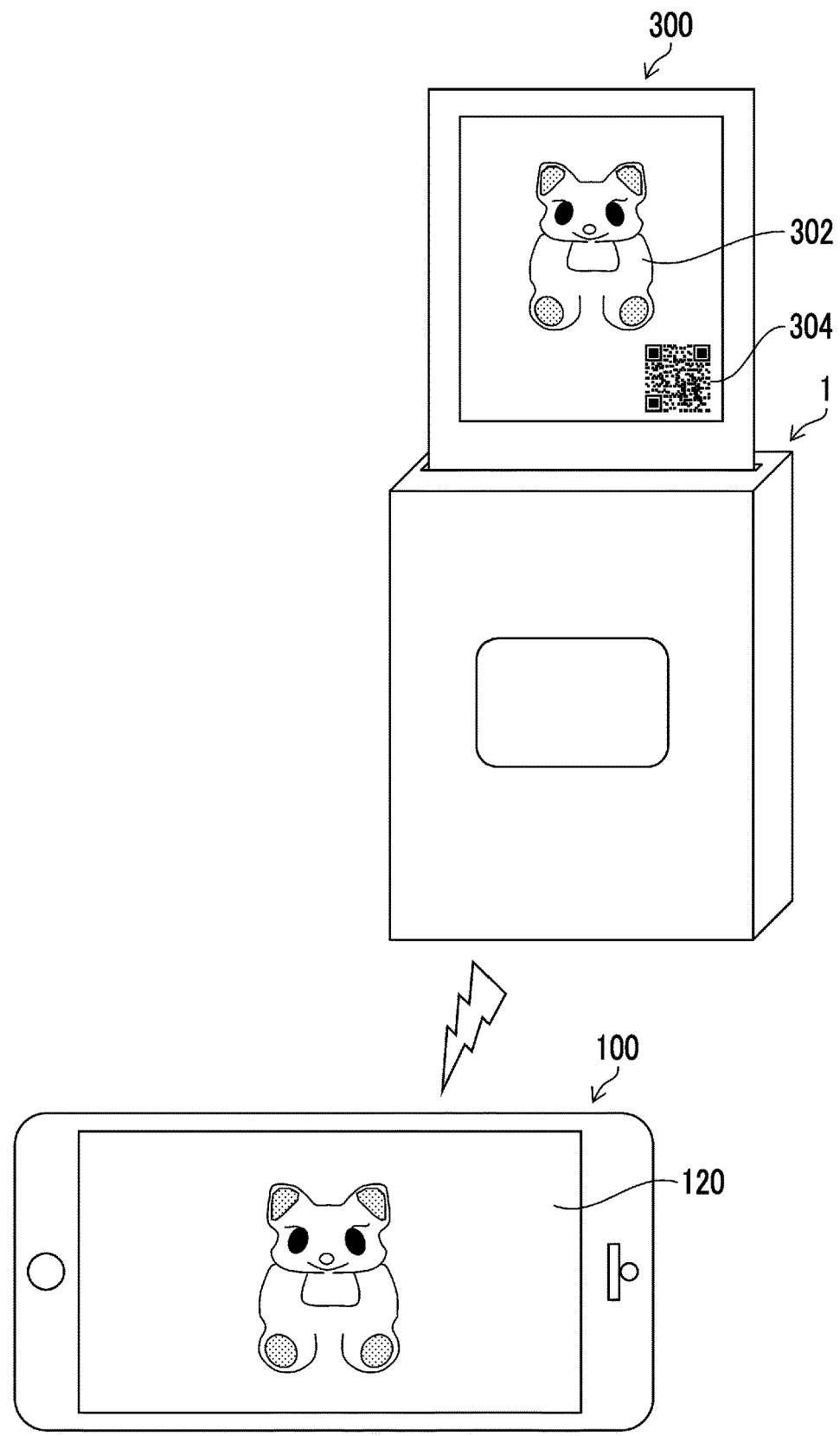
FIG. 10 is a diagram for describing printing of the character image.

FIG. 10 is a diagram for describing printing of the character image.

The camera-equipped information terminal 100 transmits the printing instruction of the character image 302 displayed on the display and input unit 120 to the mobile printer 1. The mobile printer 1 that has received the printing instruction from the camera-equipped information terminal 100 prints the character card 300 on which the character image 302 and the code image 304 are printed. In addition, the camera-equipped information terminal 100 detects output of the printing instruction of the character image 302 and transmits the detection information (first information) to the character status management server 200 via the main controller 101. Accordingly, the camera-equipped information terminal 100 can also access the character image by outputting the printing instruction of the character image displayed on the display and input unit 120.

Next, an image display method of the character image display system 10 will be described. The image display method is performed by executing a dedicated program via a processor (the first processor and the second processor) constituting the character image display system 10. In addition, for example, the dedicated program is stored in the internal storage unit 151 in the case of the camera-equipped information terminal 100 and is present in the web application 210 in the case of the character status management server 200.

First, acquisition of the character card 300 by performing printing for the first time will be described.

Figure 11:
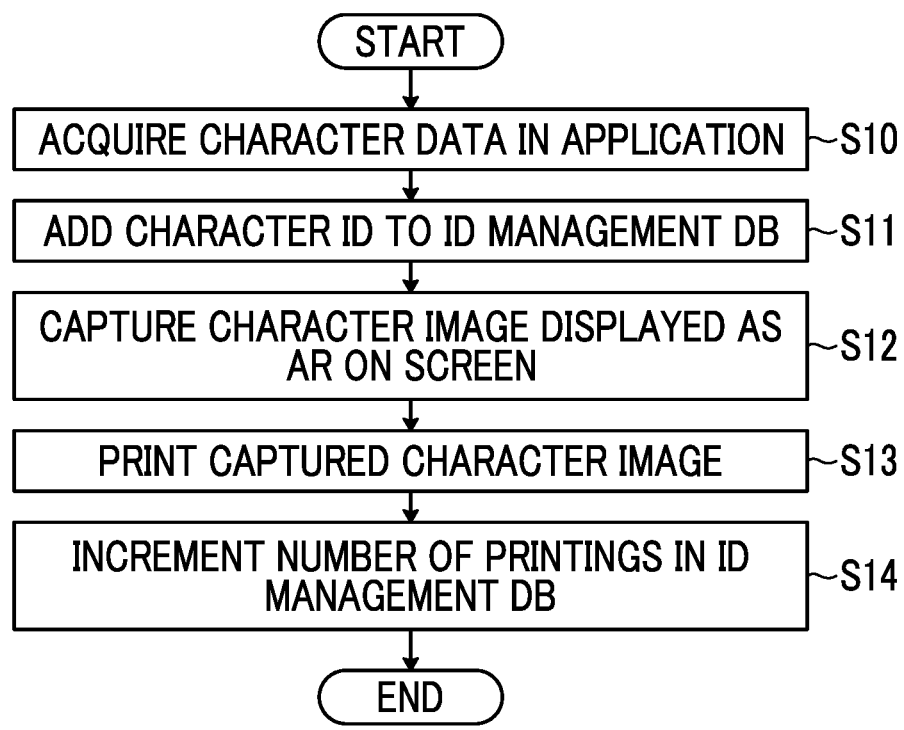
FIG. 11 is a flowchart for describing printing performed for the first time.

FIG. 11 is a flowchart for describing printing performed for the first time.

First, character data selected or acquired by the user in the game provided by the game server 310 is acquired by the web application 210 (step S10). Next, the character ID and the status information of the character selected or acquired by the user are added to the ID management DB 240 by the DB update unit 210A of the web application 210 (step S11). Next, the character image displayed as an augmented reality (AR) on the display and input unit 120 by the display controller 210B of the web application 210, is captured (step S12). Next, the camera-equipped information terminal 100 transmits the printing instruction to the mobile printer 1 to print the captured character image (step S13). Accordingly, the user can acquire the character card 300 having the character image (first character image) and the code image 304. Then, the camera-equipped information terminal 100 transmits the first information to the character status management server 200, and the DB update unit 210A increments the number of printings in the ID management DB (step S14).

As described above, the user first participates in the game provided by the game server 310, acquires the character, and obtains the character card 300 on which the character image is printed. Accordingly, the user can hold the character card 300 on which the character image of the user is printed, and attachment and interest with respect to the character are further increased.

Figure 12:
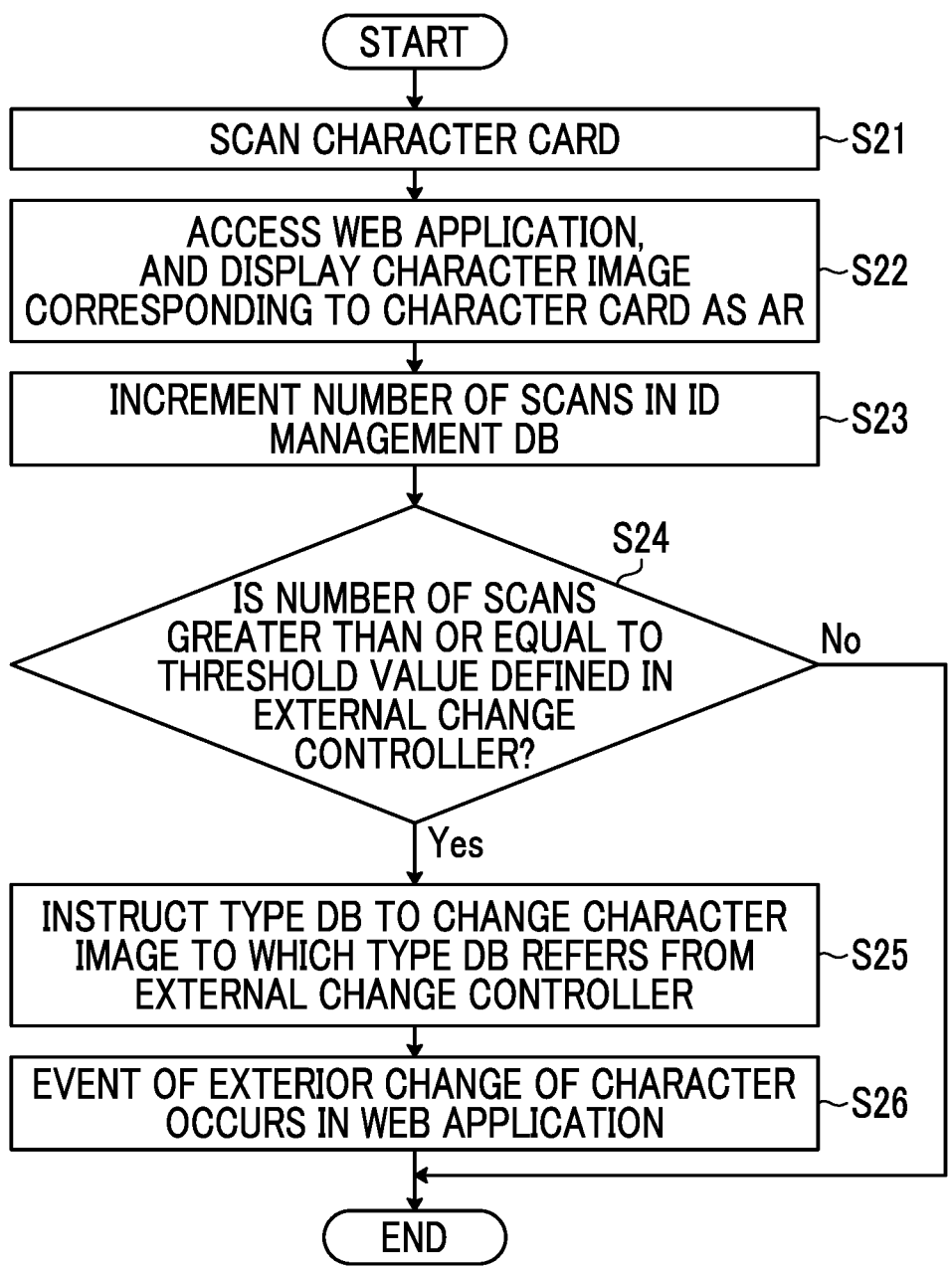
FIG. 12 is a flowchart for describing a case where scanning of the character image is executed and where an exterior change of the character image occurs.

FIG. 12 is a flowchart for describing a case where scanning of the character image is executed and where the exterior change of the character image occurs.

First, the camera-equipped information terminal 100 scans the character card 300 (step S21). Specifically, the camera-equipped information terminal 100 scans the character image by reading the code image 304 of the character card 300 via the camera units 141 and 142 of the camera-equipped information terminal 100. Then, the camera-equipped information terminal 100 accesses the web application 210 and displays the character image printed on the scanned character card 300 as an AR on the display controller 210B (step S22). In addition, the camera-equipped information terminal 100 detects scanning of the character image and transmits the detection information (second information) to the character status management server 200 via the main controller 101. Then, the DB update unit 210A of the web application 210 increments the number of scans in the ID management DB 240 (step S23). Next, whether or not the number of scans is greater than or equal to the threshold value defined in the exterior change controller 260 is determined by the exterior change controller 260 (step S24). In a case where the number of scans is greater than or equal to the threshold value, the exterior change controller 260 changes the character image to which the type DB 230 refers (step S25). Then, the exterior change of the character image occurs in the character image displayed on the display and input unit 120 of the camera-equipped information terminal 100 (step S26).

In the description of FIG. 12, an example of transmitting the second information, determining whether or not the number of scans is greater than or equal to the threshold value, and performing the exterior change of the character image in a case where the number of scans is greater than or equal to the threshold value has been described. The same applies to a case where the first information is transmitted as described in FIG. 10. Whether or not the number of scans is greater than or equal to the threshold value is determined, and the exterior change of the character image is performed in a case where the number of scans is greater than or equal to the threshold value.

Figure 13:
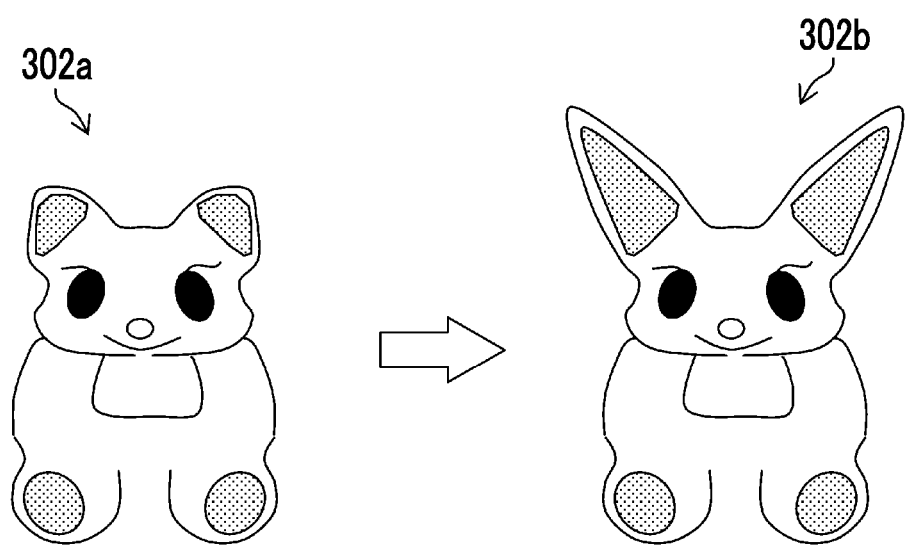
FIG. 13 is a conceptual diagram for describing the exterior change of the character image.

FIG. 13 is a conceptual diagram for describing the exterior change of the character image.

A character image (first character image) 302a before the exterior change and a character image (second character image) 302b after the exterior change are illustrated in FIG. 13. The character image 302a is displayed as an AR on the display and input unit 120 of the camera-equipped information terminal 100 in step S22 described above. Then, in a case where the exterior change occurs in step S26 described above, the character image 302b is displayed on the display and input unit 120 of the camera-equipped information terminal 100. Accordingly, the exterior change of the character image is performed on the display and input unit 120 of the camera-equipped information terminal 100. In a case where the exterior change of the character image is performed, an effect added to the character image, such as changing a BGM, voice, or display of the character, may be provided. In this case, effect information is transmitted to the camera-equipped information terminal 100 from the character status management server 200.

As described above, in the character image display system 10 according to the embodiment of the present invention, the exterior change of the character occurs in a case where the user accesses the character image. Accordingly, the user can make the exterior change of the character image by accessing the character and can enjoy the game with more attachment to the character.

Next, the mobile printer 1 will be described.

Figure 14:
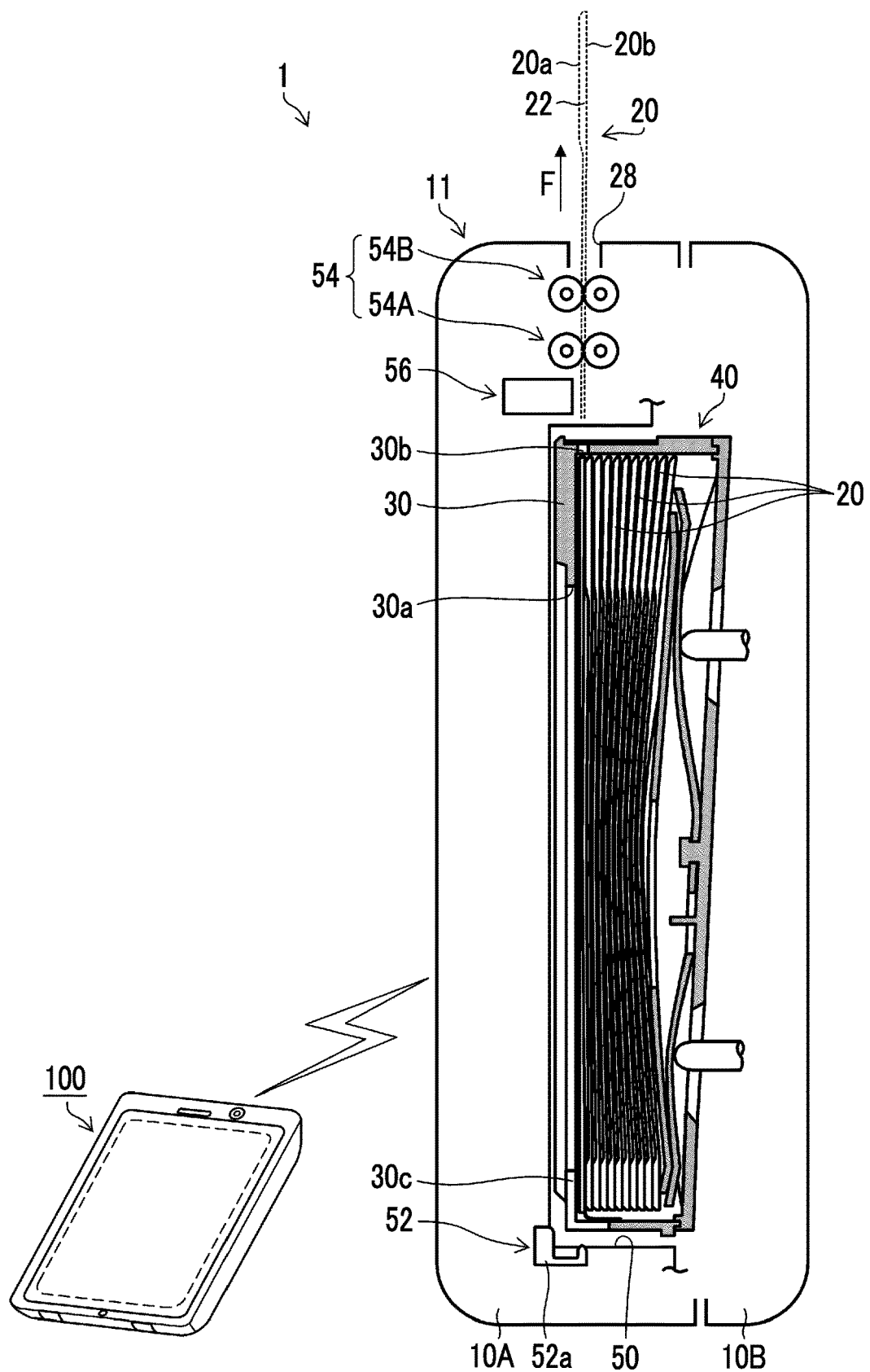
FIG. 14 is a diagram illustrating a mechanical configuration inside a mobile printer.

FIG. 14 is a diagram illustrating a mechanical configuration inside the mobile printer 1. Only a configuration of a main part is illustrated in FIG. 14.

The mobile printer 1 illustrated in FIG. 14 uses an instant film 20 as a print medium and comprises an instant film pack 40, a film loading chamber 50, a film feeding mechanism 52, a film transport mechanism 54, and a printhead 56.

The instant film pack 40 has a structure in which a plurality of instant films 20 are accommodated in a case 30.

Figure 15:
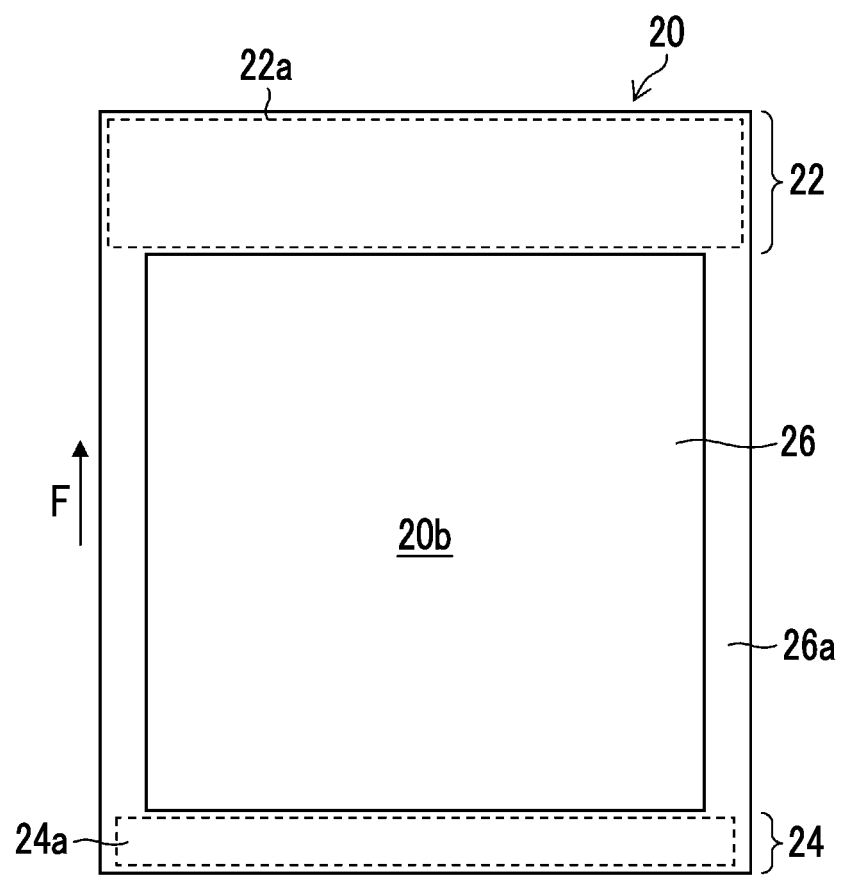
FIG. 15 is a front view of an instant film.

FIG. 15 is a front view of the instant film 20.

In FIG. 15, a direction indicated by arrow F is a use direction of the instant film 20. That is, the instant film 20 is used by feeding the instant film 20 in the direction indicated by arrow F. Accordingly, in a case where the instant film 20 is loaded into the mobile printer 1, the direction indicated by arrow F is a discharge direction of the instant film 20.

The instant film 20 has a rectangular card shape. The instant film 20 is composed of an exposure surface 20a (FIG. 14) on a rear surface side and an observation surface 20b on a front surface side. The exposure surface 20a is a surface on which an image is printed (recorded) by exposure, and the observation surface 20b is a surface on which the printed image is observed.

The instant film 20 is provided with a pod portion 22 and a trap portion 24 between which an exposed portion on which the image is printed by exposure is interposed.

The pod portion 22 is disposed on a front side in the use direction F with respect to the exposed portion. A development treatment liquid pod 22a encompassing a development treatment liquid is incorporated in the pod portion 22.

The trap portion 24 is disposed on a rear side in the use direction F with respect to the exposed portion. An absorbent 24a is incorporated in the trap portion 24.

In FIG. 15, an observation portion 26 is comprised on the observation surface 20b of the instant film 20. The observation portion 26 is a part on which the image is displayed. The image is displayed on the observation portion 26 by performing development treatment on the exposed portion. The observation portion 26 is disposed to correspond to the exposed portion. A frame 26a is comprised around the observation portion 26. Accordingly, the image is displayed within the frame.

The instant film 20 is viewed in a direction in which the trap portion 24 is up and the pod portion 22 is down. Accordingly, the image is printed in a direction in which the trap portion 24 is up and the pod portion 22 is down.

The instant film 20 is subjected to the development treatment by spreading the development treatment liquid of the pod portion 22 on the exposed portion after the exposure. The development treatment liquid of the pod portion 22 is squeezed out from the pod portion 22 by passing the instant film 20 between a roller pair and is spread on the exposed portion. The development treatment liquid that is left during spreading processing is trapped in the trap portion 24.

The case 30 of the instant film pack 40 illustrated in FIG. 14 has a rectangular box shape. The case 30 has an opening portion 30a for exposure on a front surface part and has a discharge port 30b having a slit shape on a top surface part. The instant film 20 is accommodated in a pile inside the case with the exposure surface 20a facing a front surface side of the case 30 and with the pod portion 22 facing a top surface side of the case 30.

In addition, the case 30 has a claw opening portion 30c having a slit shape on a bottom surface part. The instant film 20 accommodated in the case 30 is fed toward the discharge port 30b and discharged from the discharge port 30b one sheet at a time by causing a claw to enter the case 30 from the claw opening portion 30c. A print discharge port 28 is comprised at a center of a top surface of a printer body 11 in a width direction as a slit through which the instant film can pass. The instant film 20 is discharged straight up from the print discharge port 28.

One instant film pack 40 accommodates 10 instant films 20.

The film loading chamber 50 is comprised in a body part 10A of the printer body 11 as a recessed portion in which the instant film pack 40 can be accommodated. In a case where a rear lid portion 10B of the printer body 11 is open, the film loading chamber 50 is exposed, and the instant film pack 40 can be loaded. The film feeding mechanism 52 feeds the instant film 20 one sheet at a time from the instant film pack 40 loaded in the film loading chamber 50. The film feeding mechanism 52 comprises a claw 52a that moves forward and rearward along a feeding direction of the instant film 20. The instant film 20 is fed from the instant film pack 40 by pulling the instant film 20 inside the case one sheet at a time using the claw 52a.

The film transport mechanism 54 transports the instant film 20 fed from the instant film pack 40 by the film feeding mechanism 52 at a constant speed. The film transport mechanism 54 comprises a transport roller pair 54A and a spreading roller pair 54B.

The transport roller pair 54A is driven by a motor, not illustrated, to rotate and transport the instant film 20 by pinching both sides of the instant film 20.

The spreading roller pair 54B is driven by a motor, not illustrated, to rotate and transport the instant film 20 by pinching the entire instant film 20. During the transport, the pod portion 22 of the instant film 20 is squeezed to perform the spreading processing of the development treatment liquid.

The printhead 56 is driven based on the image data of the image for the print and prints the image on the instant film 20 fed from the instant film pack 40. The printhead 56 is composed of a lamp type exposure head. The printhead 56 prints the image on the instant film 20 in a single pass by irradiating the exposure surface 20a of the instant film 20 transported by the film transport mechanism 54 with print light one line at a time.

The mobile printer 1 comprises a short range wireless communication unit (not illustrated) and can receive the image data for the print by performing wireless communication with an external apparatus.

Accordingly, the mobile printer 1 can print the image on the instant film 20 by receiving the image data of the image for the print from the external input and output unit 160 or the wireless communication unit 110 of the camera-equipped information terminal 100 as illustrated in FIG. 14.

Application Example

Next, an application example of the character image display system 10 according to the embodiment of the present invention will be described.

Figure 16:
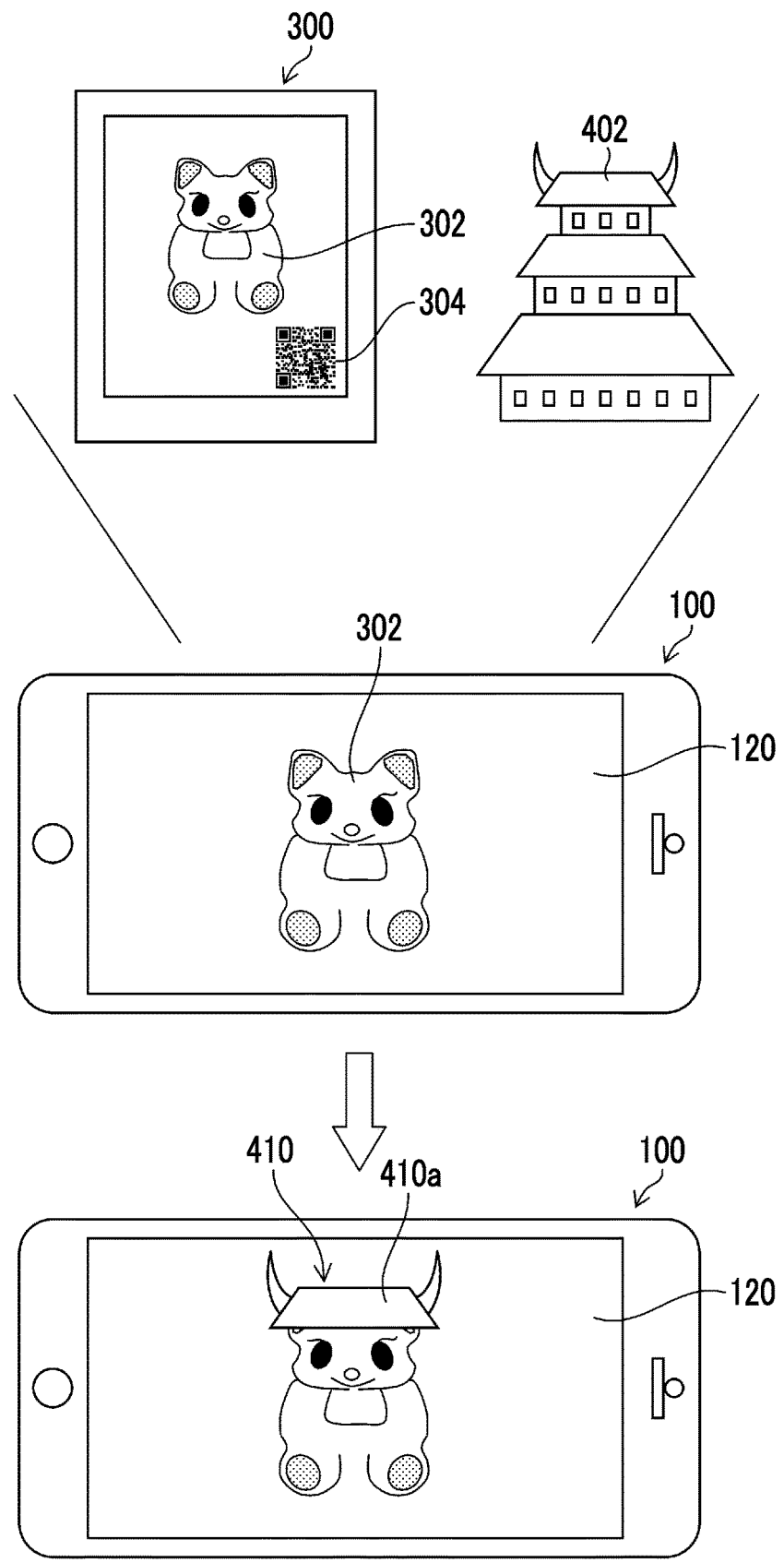
FIG. 16 is a diagram for describing Application Example 1.

FIG. 16 is a diagram for describing Application Example 1 of the character image display system 10 according to the embodiment of the present invention.

In the present example, a special exterior change is performed in the character image depending on a location or a time in which the character image is scanned. For example, in a case where the character card 300 is scanned together with a castle 402, the character image 302 is changed to a character image 410 by performing the special exterior change. The character image 410 is wearing a helmet 410a related to the castle 402 and is obtained by performing the special exterior change from the character image 302. In the case of the present example, the main controller 101 of the camera-equipped information terminal 100 transmits the second information to the character status management server 200 and transmits acquisition information that is information related to a location or a time in which the character image (code image) is captured to the character status management server 200. The acquisition information is acquired by a clock comprised in the main controller 101 or by the GPS reception unit 170 incorporated in the camera-equipped information terminal 100.

Accordingly, by performing the special exterior change on the character image depending on the location or the time in which the character image is scanned, the user is further attached to the character.

As another embodiment of Application Example 1, for example, in a case where the character image is scanned on the Christmas night, the exterior change is performed to a character image of a Santa Claus.

Figure 17:
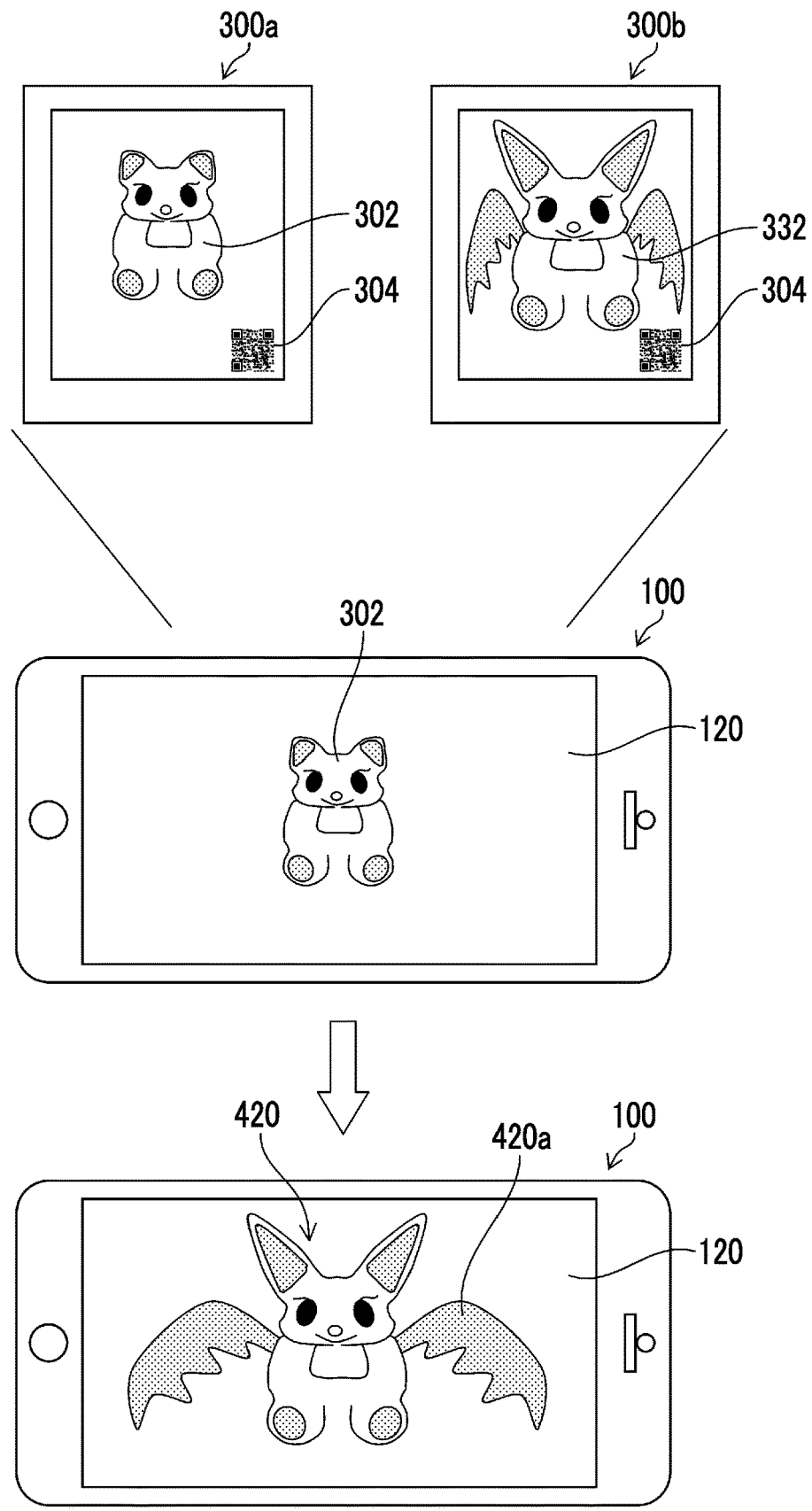
FIG. 17 is a diagram for describing Application Example 2.

FIG. 17 is a diagram for describing Application Example 2 of the character image display system 10 according to the embodiment of the present invention.

In the present example, a special exterior change is performed on the character image by scanning a character card 300a and a character card 300b at once or consecutively.

As illustrated in FIG. 17, in a case where the camera-equipped information terminal 100 scans the character card 300a and the character card 300b, the character image 302 is changed to a character image 420 by performing the special exterior change. The character image 420 has large special wings 420a and is obtained by performing the special exterior change from the character image 302. The camera-equipped information terminal 100 transmits the second information of the character image 302 and of a character image 332 to the character status management server 200, and the character status management server 200 performs the exterior change to the character image 420 corresponding to the second information of the character image 302 and of the character image 332.

Accordingly, by performing the special exterior change corresponding to the character images in a case where a plurality of character images are scanned, the user can enjoy the exterior change of the character.

Other

The print system of the present embodiment is merely an example, and the present invention can also be applied to other configurations. Each functional configuration can be appropriately implemented by any hardware, software, or a combination of both of hardware and software. For example, the present invention can also be applied to a program that causes a computer to execute processing in each part of the print system or to a computer readable recording medium (non-transitory recording medium) on which the program is recorded.

In addition, in the present embodiment, for example, a hardware structure of a processing unit that executes various types of processing, such as the main controller 101 of the camera-equipped information terminal 100 and the web application 210 and the exterior change controller 260 of the character status management server 200, corresponds to the following various processors. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be composed of one of the various processors or may be composed of two or more processors of the same type or different types (for example, a plurality of FPGAs or a combination of a CPU and an FPGA). In addition, a plurality of processing units may be composed of one processor. As an example of a plurality of processing units composed of one processor, first, as represented by a computer such as a client or a server, a form in which one processor is composed of a combination of one or more CPUs and software and the processor functions as a plurality of processing units is possible. Second, as represented by a system on chip (SoC) or the like, a form of using a processor that implements functions of the entire system including a plurality processing units in one integrated circuit (IC) chip is possible. Accordingly, various processing units are configured using one or more of the various processors as a hardware structure.

Furthermore, the hardware structure of those various processors is more specifically an electric circuit (circuitry) in which circuit elements such as semiconductor elements are combined.

In addition, the printer of the present embodiment is not limited to the mobile printer 1 illustrated in FIG. 14, and various printers can be used. In addition, the print medium is not limited to the instant film 20.

In addition, a composite image in which the captured image and the CG image of the character are composited may be printed with a normal visible ink, and information embedded in the composite image may be printed with an invisible ink. The invisible ink includes an infrared ink, an ink that develops a fluorescent color with ultraviolet rays, an ink that is visualized by heat, and the like.

Each configuration and each function described above can be appropriately implemented by any hardware, software, or a combination of both of hardware and software. For example, the present invention can also be applied to a program that causes a computer to execute the processing steps (processing procedure) described above, a computer readable recording medium (non-transitory recording medium) on which the program is recorded, or a computer on which the program can be installed.

While the example of the present invention has been described above, the present invention is not limited to the embodiment described above and can, of course, be subjected to various modifications without departing from the gist of the present invention.

EXPLANATION OF REFERENCES

1: mobile printer
10: character image display system
100: camera-equipped information terminal
200: character status management server
210: web application
210A: DB update unit
210B: display controller
220: server-side communication unit
250: processor
260: exterior change controller
300: character card
310: game server
330: network

What is claimed is:
1. A system comprising:
a server including a first processor that provides a character image; and
a terminal including a second processor that communicates with the server through a network,
wherein
the first processor is configured to cause a first character image to be displayed as an augmented reality on a display of the terminal, and
the second processor is configured to:
capture the first character image displayed as the augmented reality on the display of the terminal;
associate the captured first character image with a character ID for identifying a character;

cause the captured first character image to be printed to generate a print having thereon the first character image and a code image of the character ID; and transmit detection information to the server, in a case where the captured first character image is output to a printer to generate the print, and the first processor is configured to, in a case where a number of times that the detection information is received reaches a threshold number, transmit a second character image to which the first character image is changed to the terminal.

2. The system according to claim 1, wherein the server includes a memory that stores at least one of information about a user who owns a character of the character image, status information of the character, or information related to an exterior of the character.

3. The system according to claim 1, wherein the first processor is configured to permit the second character image to be transmitted to the terminal only a predetermined number of times in a predetermined period.

4. The system according to claim 1, wherein the second character image includes effect information that is information related to an effect added in a case where the second character image is displayed.

5. The system according to claim 1, wherein the character image is composed of a character of a game or of a captured image of a person.

6. An image display method of a system including a server including a first processor that provides a character image and a terminal including a second processor that communicates with the server through a network, the image display method comprising:

acquiring by the second processor, a first character image to be displayed as an augmented reality on a display of the terminal, from the first processor;

capturing the first character image displayed as the augmented reality on the display of the terminal;

associating the captured first character image with a character ID for identifying a character;

causing by the second processor, the captured first character image to be printed to generate a print having thereon the first character image and a code image of the character ID;

transmitting by the second processor, detection information to the server in a case where the terminal outputs the captured first character image to a printer to generate the print; and transmitting by the first processor, a second character image to which the first character image is changed to the terminal in a case where a number of times that the detection information is received reaches a threshold number.

7. A non-transitory, computer-readable tangible recording medium which records thereon a program for causing a system to execute an image display method, the system including a server including a first processor that provides a character image and a terminal including a second processor that communicates with the server through a network, the image display method comprising:

acquiring by the second processor, a first character image to be displayed as an augmented reality on a display of the terminal, from the first processor;

capturing by the second processor, the first character image displayed as the augmented reality on the display of the terminal;

associating the captured first character image with a character ID for identifying a character;

causing by the second processor, the captured first character image to be printed to generate a print having thereon the first character image and a code image of the character ID;

transmitting by the second processor, detection information to the server in a case where the terminal outputs the captured first character image to a printer to generate the print; and transmitting by the first processor, a second character image to which the first character image is changed to the terminal in a case where a number of times that the detection information is received reaches a threshold number.

8. A system comprising:

a server including a first processor;

a terminal including a second processor that communicates with the server through a network;

wherein the second processor is configured to:

capture an image of a print having thereon a first character image and a code image of a character ID for identifying a character;

display the captured first character image as augmented reality on a display of the terminal;

cause the captured first character image to be printed to generate a second print having thereon the first character image and the code image; and in a case where the captured first character image is printed is output to a printer to generate the second print, transmit detection information to the server; and wherein the first processor is configured to:

receive from the terminal, the detection information, and transmit to the terminal, the second character image to which an exterior of the first character image is changed, in a case where a number of times that the processor receives detection information from the terminal reaches a threshold number.

* * * * *